(12) United States Patent
Yang et al.

(10) Patent No.: US 11,877,293 B2
(45) Date of Patent: Jan. 16, 2024

(54) SKIPPING OCCASIONS IN SEMI-PERSISTENT SCHEDULING

(71) Applicant: QUALCOMM Incorporated, San Diego, CA (US)

(72) Inventors: Wei Yang, San Diego, CA (US); Seyedkianoush Hosseini, San Diego, CA (US); Yi Huang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/445,706

(22) Filed: Aug. 23, 2021

(65) Prior Publication Data

US 2022/0070837 A1 Mar. 3, 2022

Related U.S. Application Data

(60) Provisional application No. 62/706,568, filed on Aug. 25, 2020.

(51) Int. Cl.
*H04W 72/23* (2023.01)
*H04L 5/00* (2006.01)

(52) U.S. Cl.
CPC ........... *H04W 72/23* (2023.01); *H04L 5/0055* (2013.01)

(58) Field of Classification Search
CPC .............................. H04W 72/23; H04L 5/0055
See application file for complete search history.

(56) References Cited

U.S. PATENT DOCUMENTS

| | | | |
|---|---|---|---|
| 2017/0303302 A1* | 10/2017 | Bagheri | H04W 72/21 |
| 2019/0200382 A1* | 6/2019 | Dudda | H04L 1/1896 |
| 2019/0320396 A1* | 10/2019 | Bagheri | H04W 52/34 |
| 2020/0322930 A1* | 10/2020 | Zhou | H04L 5/0053 |
| 2021/0282164 A1* | 9/2021 | Zhou | H04L 1/1819 |
| 2021/0360652 A1* | 11/2021 | Awoniyi-Oteri | H04L 1/1621 |
| 2022/0007399 A1* | 1/2022 | Rastegardoost | H04L 1/1854 |
| 2022/0038243 A1* | 2/2022 | Shrestha | H04L 1/08 |
| 2022/0070837 A1* | 3/2022 | Yang | H04W 72/23 |
| 2022/0131673 A1* | 4/2022 | Huang | H04L 1/1671 |
| 2022/0132477 A1* | 4/2022 | Huang | H04W 72/23 |
| 2022/0248446 A1* | 8/2022 | Zewail | H04W 72/23 |
| 2023/0037847 A1* | 2/2023 | Awoniyi-Oteri | H04L 1/1864 |
| 2023/0051501 A1* | 2/2023 | Huang | H04L 1/189 |
| 2023/0093477 A1* | 3/2023 | El Hamss | H04L 1/1861 |
| 2023/0164765 A1* | 5/2023 | Göktepe | H04W 52/0216 370/329 |

FOREIGN PATENT DOCUMENTS

| | | | | |
|---|---|---|---|---|
| EP | 3030029 B1 * | 10/2018 | ........... | H04L 1/1607 |
| WO | WO-2020220883 A1 * | 11/2020 | ........... | H04W 72/042 |
| WO | WO-2021074827 A1 * | 4/2021 | ........... | H04B 7/1851 |

* cited by examiner

*Primary Examiner* — Michael J Moore, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication that one or more semi-persistent scheduling (SPS) occasions, within a periodic set of SPS occasions, will be skipped. Accordingly, the UE may refrain from monitoring, for signals from the base station, during the one or more SPS occasions that are skipped. Additionally, in some aspects, the UE may refrain from transmitting, to the base station, acknowledgment feedback associated with the one or more SPS occasions that are skipped. Numerous other aspects are provided.

30 Claims, 8 Drawing Sheets

US 11,877,293 B2

SKIPPING OCCASIONS IN SEMI-PERSISTENT SCHEDULING

CROSS-REFERENCE TO RELATED APPLICATION

This Patent Application claims priority to U.S. Provisional Patent Application No. 62/706,568, filed on Aug. 25, 2020, entitled "TEMPORARY RELEASE FOR SEMI-PERSISTENT SCHEDULING," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for skipping occasions in semi-persistent scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, an indication that one or more semi-persistent scheduling (SPS) occasions, within a periodic set of SPS occasions, will be skipped. The method may further include refraining from monitoring, for signals from the base station, during the one or more SPS occasions that are skipped.

Some aspects described herein relate to a method of wireless communication performed by a base station. The method may include transmitting, to a UE, an indication that one or more SPS occasions, within a periodic set of SPS occasions, will be skipped. The method may further include refraining from transmitting, to the UE, signals within the one or more SPS occasions that are skipped.

Some aspects described herein relate to an apparatus for wireless communication at a UE. The apparatus may include a memory and one or more processors coupled to the memory. The one or more processors may be configured to receive, from a base station, an indication that one or more SPS occasions, within a periodic set of SPS occasions, will be skipped. The one or more processors may be further configured to refrain from monitoring, for signals from the base station, during the one or more SPS occasions that are skipped.

Some aspects described herein relate to an apparatus for wireless communication at a base station. The apparatus may include a memory and one or more processors coupled to the memory. The one or more processors may be configured to transmit, to a UE, an indication that one or more SPS occasions, within a periodic set of SPS occasions, will be skipped. The one or more processors may be further configured to refrain from transmitting, to the UE, signals within the one or more SPS occasions that are skipped.

Some aspects described herein relate to a non-transitory computer-readable medium that stores a set of instructions for wireless communication by a UE. The set of instructions, when executed by one or more processors of the UE, may cause the UE to receive, from a base station, an indication that one or more SPS occasions, within a periodic set of SPS occasions, will be skipped. The set of instructions, when executed by one or more processors of the UE, may further cause the UE to refrain from monitoring, for signals from the base station, during the one or more SPS occasions that are skipped.

Some aspects described herein relate to a non-transitory computer-readable medium that stores a set of instructions for wireless communication by a base station. The set of instructions, when executed by one or more processors of the base station, may cause the base station to transmit, to a UE, an indication that one or more SPS occasions, within a periodic set of SPS occasions, will be skipped. The set of instructions, when executed by one or more processors of the base station, may further cause the base station to refrain from transmitting, to the UE, signals within the one or more SPS occasions that are skipped.

Some aspects described herein relate to an apparatus for wireless communication. The apparatus may include means for receiving, from a base station, an indication that one or more SPS occasions, within a periodic set of SPS occasions, will be skipped. The apparatus may further include means for refraining from monitoring, for signals from the base station, during the one or more SPS occasions that are skipped.

Some aspects described herein relate to an apparatus for wireless communication. The apparatus may include means for transmitting, to a UE, an indication that one or more SPS occasions, within a periodic set of SPS occasions, will be skipped. The apparatus may further include means for refraining from transmitting, to the UE, signals within the one or more SPS occasions that are skipped.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
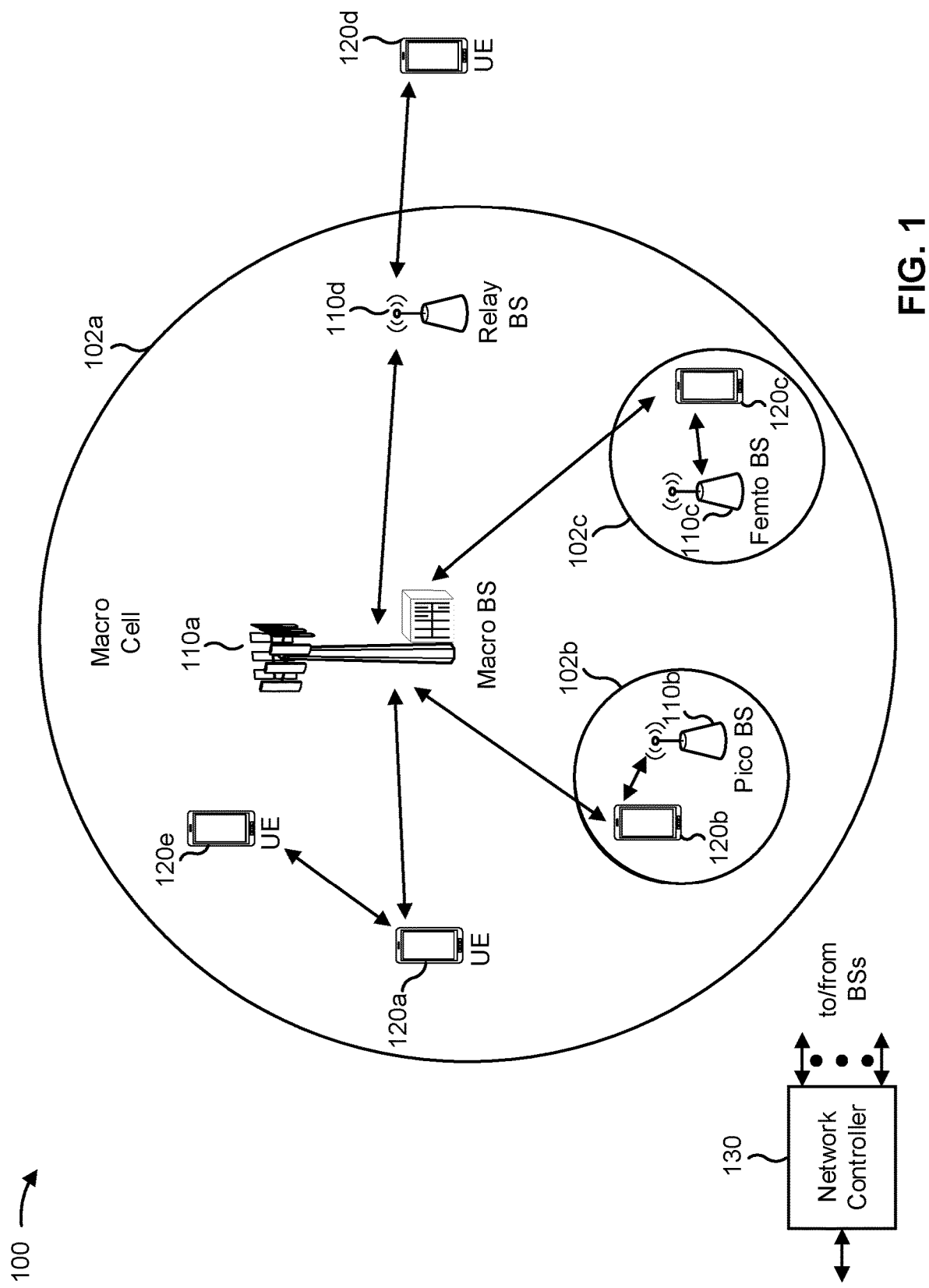
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
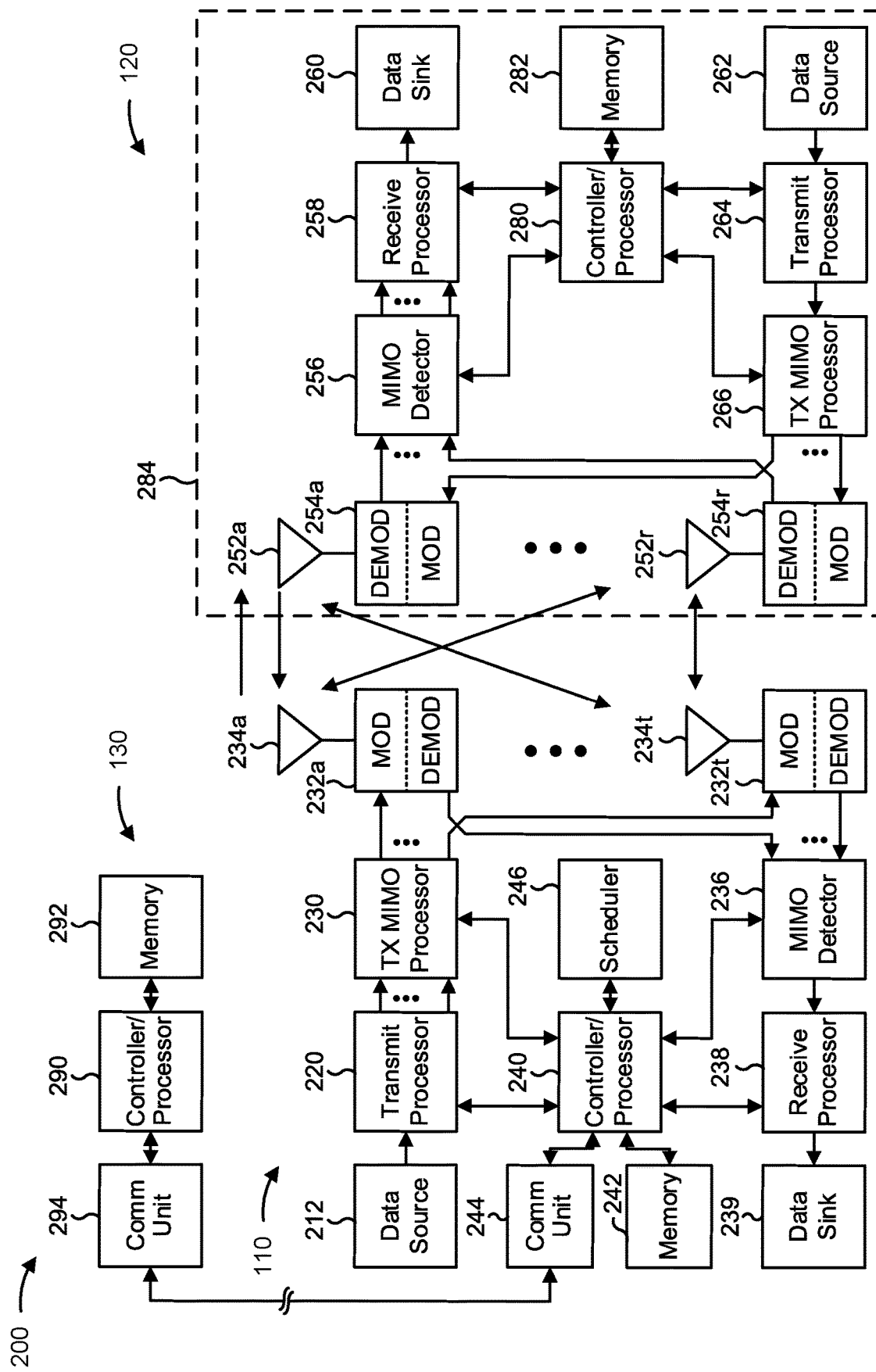
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with skipping semi-persistent scheduling (SPS) occasions, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 700 of FIG. 7) may include means for receiving, from a base station (e.g., the base station 110 and/or apparatus 800 of FIG. 8), an indication that one or more SPS occasions, within a periodic set of SPS occasions, will be skipped; and/or means for refraining from monitoring, for signals from the base station, during the one or more SPS occasions that are skipped. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., the base station 110 and/or apparatus 800 of FIG. 8) may include means for transmitting, to a UE (e.g., the UE 120 and/or apparatus 700 of FIG. 7), an indication that one or more SPS occasions, within a periodic set of SPS occasions, will be skipped; and/or means for refraining from transmitting, to the UE, signals within the one or more SPS occasions that are skipped. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
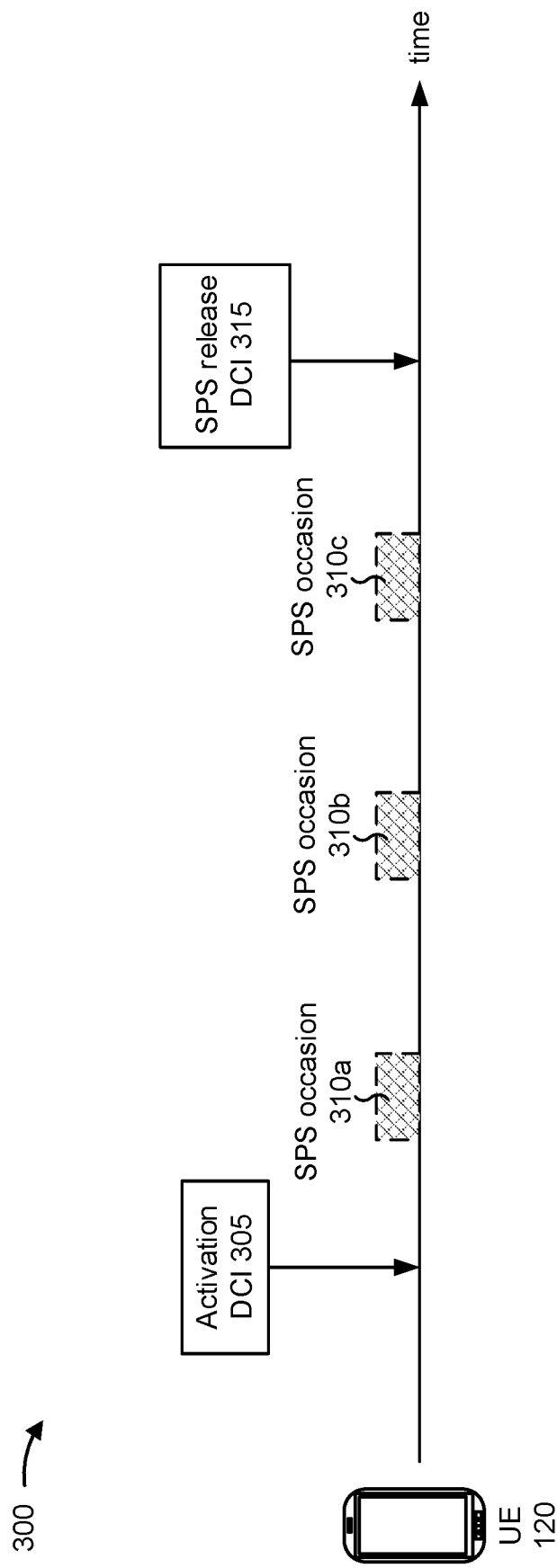
FIG. 3 is a diagram illustrating an example of activating and releasing semi-persistent scheduling (SPS) occasions, in accordance with the present disclosure.

FIG. 3 is a diagram illustrating an example 300 of activating and releasing SPS occasions, in accordance with the present disclosure. As used herein, "semi-persistent scheduling" or "SPS" may refer to a configuration of frequency resources (e.g., one or more frequencies) and time resources (e.g., one or more symbols) that repeat across time. These resources that repeat across time are "SPS occasions." Accordingly, a base station (e.g., base station 110) may transmit to a UE (e.g., UE 120) during SPS occasions as long as the base station 110 has activated the SPS occasions. The base station 110 activates SPS occasions as described below.

As shown in FIG. 3, the UE 120 may receive (e.g., from the base station 110) control information 305 (e.g., downlink control information (DCI) and/or other control information)

that activates a set of SPS occasions (e.g., SPS occasion 310a, SPS occasion 310b, and SPS occasion 310c in example 300). The UE 120 may validate the control information 305 based at least in part on a cyclic redundancy check (CRC) value associated with the control information 305 being scrambled with an identifier associated with the UE (e.g., a configured scheduling (CS) radio network temporary identifier (CS-RNTI) and/or another identifier). Additionally, or alternatively, the UE 120 may validate the control information 305 based at least in part on a field included in the control information 305 (e.g., a new data indicator field being set to zero).

In some aspects, the UE 120 may further determine that the control information 305 activates the set of SPS occasions based on one or more fields included in the control information 305. For example, the UE 120 may validate that the control information 305 is in an SPS activation format for DCI (e.g., as defined in 3GPP specifications and/or another standard) based at least in part on codepoints of the one or more fields. In some aspects, the UE 120 may verify that the codepoints of a hybrid automatic repeat request (HARD) process number are all set to zero and/or that the codepoints of a redundancy version (RV) are all set to zero.

In some aspects, the base station 110 may configure the set of SPS occasions using radio resource control (RRC) signaling and/or other signaling from the base station 110 to the UE 120. For example, the base station 110 may transmit, to the UE 120, an SPS-Config data structure (e.g., as defined in 3GPP specifications and/or another standard), or a similar data structure, that defines the set of SPS occasions. The set of SPS occasions may provide periodic windows during which the UE 120 monitors for signals from the base station 110 (e.g., on a physical downlink shared channel (PDSCH) and/or another downlink channel) without having to receive new control information, such as new DCI (e.g., on a physical downlink control channel (PDCCH) and/or another downlink channel). Accordingly, in some aspects, the data structure may include a periodicity parameter (e.g., as defined in 3GPP specifications and/or another standard), which may indicate a periodicity for the SPS occasions; an nrofHARQ-Processes integer (e.g., as defined in 3GPP specifications and/or another standard) and/or an n1PUCCH-AN resource (e.g., as defined in 3GPP specifications and/or another standard), which may indicate how the UE 120 should acknowledge signals received in the SPS occasions; an mcs-Table (e.g., as defined in 3GPP specifications and/or another standard), which may indicate an MCS to use when receiving signals in the SPS occasions; and/or another parameter defining the set of SPS occasions.

Additionally, or alternatively, the base station 110 may transmit, to the UE 120, a ConfiguredGrantConfig data structure (e.g., as defined in 3GPP specifications and/or another standard), or a similar data structure, that defines resources for the UE 120 to use when transmitting data to the base station (e.g., on a physical uplink shared channel (PUSCH) and/or another uplink channel) during a set of uplink occasions. For example, the base station may indicate an MCS, a DMRS, a resource block (RB) size, and/or another parameter for the UE 120 to use for uplink configured grant (ULCG) transmission during the set of uplink occasions without having to receive DCI to schedule the transmission.

Accordingly, as described above, the base station 110 may transmit data, to the UE 120, during the SPS occasions (e.g., SPS occasion 310a, SPS occasion 310b, and/or SPS occasion 310c) without having to send additional control information (e.g., additional DCI over a PDCCH). Therefore, the base station 110 conserves network overhead and processing resources when periodically transmitting data to the UE 120. Similarly, the UE 120 conserves battery power and processing resources when periodically receiving data from the base station 110.

As further shown in FIG. 3, the UE 120 may receive, from the base station 110, control information 315 (e.g., DCI and/or other control information) that releases the set of SPS occasions. In some aspects, the UE 120 may validate the control information 315, similar to the control information 305. For example, the UE 120 may validate the control information 315 based at least in part on a CRC value associated with the control information 315 being scrambled with an identifier associated with the UE (e.g., a CS-RNTI and/or another identifier). Additionally, or alternatively, the UE 120 may validate the control information 315 based at least in part on a field included in the control information 315 (e.g., a new data indicator field being set to zero).

In some aspects, the UE 120 may further determine that the control information 315 releases the set of SPS occasions based on one or more fields in included in the control information 315. For example, the UE 120 may validate that the control information 315 is in an SPS release format for DCI (e.g., as defined in 3GPP specifications and/or another standard) based at least in part on codepoints of the one or fields. In some aspects, the UE 120 may verify that the codepoints of a HARQ process number are all set to zero, that the codepoints of an RV are all set to zero, that the codepoints of an MCS indicator are all set to one, and/or that the codepoints of a frequency domain resource assignment (FDRA) indicator are all set to zero or all set to one.

In some situations, a base station may skip one or more SPS occasions when no data is to be transmitted to a UE. The base station skips an SPS occasion by not transmitting signals to the UE (e.g., when a downlink buffer at the base station is empty). However, the UE may still consume power and processing resources by monitoring the one or more SPS occasions and may consume network overhead by transmitting HARQ feedback associated with the one or more SPS occasions. Accordingly, to conserve power and processing resources at the UE, the base station may release the set of SPS occasions and then reactivate the set of SPS occasions; however, the base station consumes network overhead, as well as power and processing resources at the base station, by using multiple DCI transmissions from the base station to the UE in order to deactivate and reactivate the set of SPS occasions.

Techniques and apparatuses described herein enable a base station (e.g., base station 110) to configure a UE (e.g., UE 120) to skip one or more SPS occasions in a set of SPS occasions, without releasing the whole set of SPS occasions. As used herein, "skipping" SPS occasions may also be referred to as "temporarily releasing" SPS occasions. As a result, the base station 110 reduces network overhead and conserves power and processing resources at the base station 110 as compared with releasing and then reactivating the set of SPS occasions. Additionally, the UE 120 conserves power and processing resources as compared with monitoring SPS occasions in which the base station 110 does not transmit data.

As indicated above, FIG. 3 is provided as an example. Other examples may differ from what is described with respect to FIG. 3.

Figure 4:
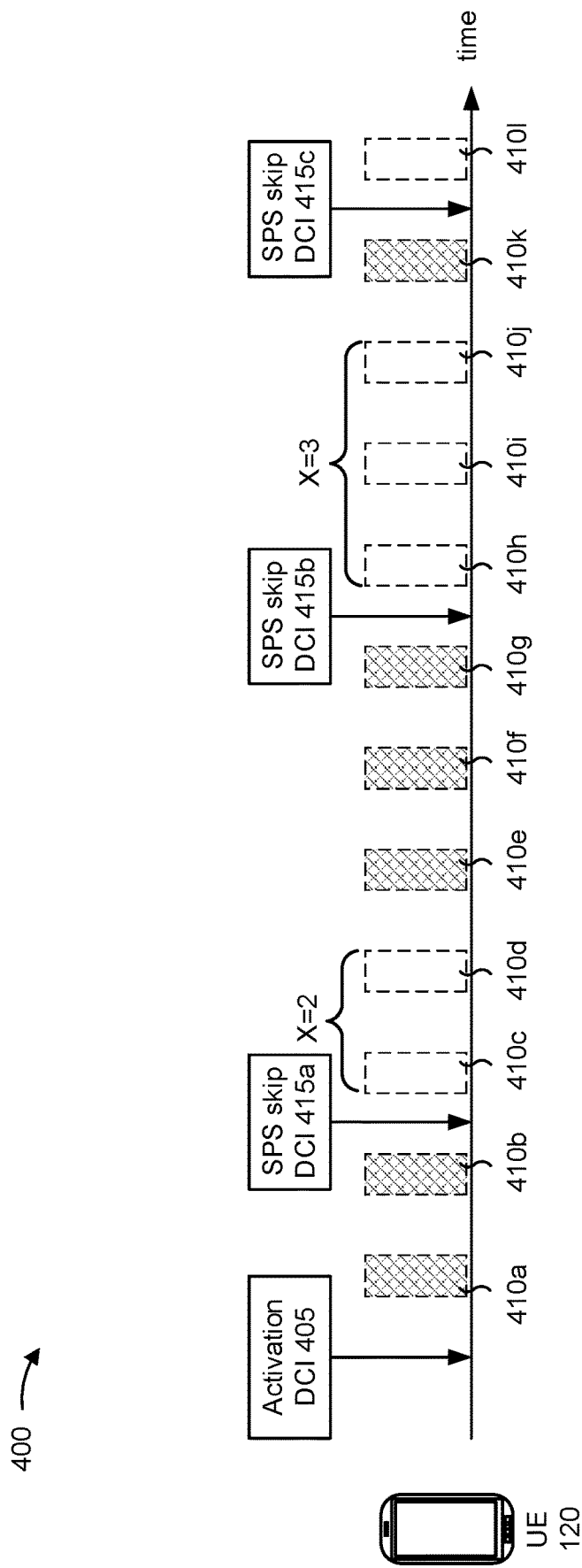
FIG. 4 is a diagram illustrating an example associated with skipping SPS occasions, in accordance with the present disclosure.

FIG. 4 is a diagram illustrating an example 400 associated with skipping SPS occasions, in accordance with the present disclosure. As shown in FIG. 4, a UE 120 may monitor a periodic set of SPS occasions (e.g., SPS occasion 410a, SPS occasion 410b, and so on) configured by a base station (e.g., base station 110). For example, the base station 110 may transmit, and the UE 120 may receive (e.g., using RRC signaling and/or other signaling), an SPS-Config data structure (e.g., as defined in 3GPP specifications and/or another standard), or a similar data structure, that defines the periodic set of SPS occasions. Accordingly, the base station 110 may transmit within the SPS occasions, and the UE 120 may receive during the SPS occasions, data (e.g., on a PDSCH and/or another downlink channel) without new control information, such as new DCI (e.g., on a PDCCH and/or another downlink channel).

In some aspects, the base station 110 may transmit, and the UE 120 may receive, an indication that the periodic set of SPS occasions is configured for skipping. For example, the base station 110 may transmit, and the UE 120 may receive, the SPS-Config data structure including a new parameter (e.g., as defined in 3GPP specifications and/or another standard) indicating that the periodic set of SPS occasions is configured for skipping.

Additionally with the RRC configuration described above, and as shown in FIG. 4, the base station 110 may transmit, and the UE 120 may receive, control information 405 activating the periodic set of SPS occasions. For example, the control information 405 may comprise DCI and/or other control information. In some aspects, the UE 120 may validate the control information 405 based at least in part on a CRC value associated with the control information being scrambled with an identifier associated with the UE 120 (e.g., a CS-RNTI and/or another identifier). Additionally, or alternatively, the UE 120 may validate the control information 405 based at least in part on a field included in the control information 405 (e.g., a new data indicator field being set to zero).

In some aspects, the UE 120 may further determine that the control information 405 activates the periodic set of SPS occasions based on one or more fields included in the control information 405. For example, the UE 120 may validate that the control information 405 is in an SPS activation format for DCI (e.g., as defined in 3GPP specifications and/or another standard) based at least in part on codepoints of the one or more fields. In some aspects, the UE 120 may verify that the codepoints of a HARQ process number are all set to zero and/or that the codepoints of an RV are all set to zero.

As further shown in FIG. 4, the base station 110 may transmit, and the UE 120 may receive, an indication (e.g., DCI 415a, DCI 415b, and/or DCI 415c in example 400) that the base station 110 will not transmit data during one or more SPS occasions (e.g., the next SPS occasion, the next two SPS occasions, the next three SPS occasions, and so on) within the periodic set of SPS occasions. Accordingly, the base station 110 may transmit, and the UE 120 may receive, an indication that the one or more SPS occasions will be skipped. In some aspects, the indication may comprise control information, such as DCI. As an alternative, the indication may comprise a medium access control (MAC) control element (MAC-CE), a DMRS, and/or another message or signal. In some aspects, the UE 120 may validate the indication based at least in part on a CRC value associated with the indication being scrambled with an identifier associated with the UE 120 (e.g., a CS-RNTI and/or another identifier). Additionally, or alternatively, the UE 120 may validate the indication based at least in part on a field included in the indication (e.g., a new data indicator field being set to zero).

In some aspects, the UE 120 may further determine that the indication is associated with skipping the one or more SPS occasions, of the periodic set of SPS occasions, based on one or more fields in included in the indication. For example, an SPS skipping format may be the same as an SPS release format for DCI (e.g., DCI format 1_0, DCI format 1_1, DCI format 1_2, and/or another format). For example, the base station 110 may transmit, and the UE 120 may receive, a configuration that indicates that the SPS release format includes the indication. Accordingly, the UE 120 may determine whether the indication indicates SPS skipping based at least in part on the configuration and the indication being encoded according to the SPS release format. As an alternative, the UE 120 may validate that the indication is in a new SPS skipping format for DCI (e.g., as defined in 3GPP specifications and/or another standard).

The UE 120 may validate the indication based at least in part on at least one codepoint of at least one control field in the SPS release format. For example, the at least one control field may include an RV, an indication of an MCS, an indication of an FDRA, an indication of a time-domain resource allocation (TDRA), an indication of a virtual to physical (VRB-to-PRB) mapping, or a combination thereof. Additionally, the UE 120 may verify that the at least one codepoint of the at least one control field is set to all ones or all zeroes. For example, the UE 120 may validate the indication based at least in part on one or more codepoints of the RV being set to all ones and/or one or more codepoints of the MCS indicator being set to all zeroes. Additionally, or alternatively, the UE 120 may validate the indication based at least in part on one or more codepoints of the TDRA indicator being set to all ones or to all zeroes and/or one or more codepoints of the VRB-to-PRB mapping indicator being set to all ones or to all zeroes.

In some aspects, the UE 120 may determine whether the indication is associated with a regular SPS release (e.g., as described in connection with FIG. 3) or skipping one or more SPS occasions, as described herein. For example, the UE 120 may determine that the indication is a regular release (e.g., of the whole set of SPS occasions) when the RV is set to all zeroes, the MCS indicator is set to all ones, and the FDRA indicator is set to all zeroes or all ones (e.g., depending on one or more properties of the set of SPS occasions). Accordingly, the UE 120 may determine that the indication is associated with skipping one or more SPS occasions (e.g., of the periodic set SPS occasions) when codepoints of the RV, the MCS indicator, and/or the FDRA indicator are set differently. Other examples may use different combinations of the RV, the MCS indicator, the FDRA indicator, the TDRA indicator, the VRB-to-PRB mapping indicator, and/or another parameter to indicate whether the indication is a regular SPS release or associated with skipping one or more SPS occasions. Additionally, or alternatively, in some aspects, as described in further detail below, the UE 120 may determine a quantity of SPS occasions to be skipped (represented using variable X in FIG. 4) based at least in part on the at least one codepoint of the at least one control field.

The base station 110 may refrain from transmitting data within the one or more SPS occasions that are skipped, and the UE 120 may refrain from monitoring for data during the one or more SPS occasions that are skipped. Accordingly, in example 400, the base station 110 refrains from transmitting within, and the UE 120 refrains from monitoring during, SPS occasions 410c and 410d (e.g., based on DCI 415a), SPS occasions 410h, 410i, and 410j (e.g., based on DCI 415b), and SPS occasion 410l (e.g., based on DCI 415c).

In some aspects, the one or more SPS occasions may include a first SPS occasion that ends no earlier than a last symbol of the slot (e.g., a PDCCH slot and/or another downlink slot) that carries the indication (e.g., SPS skip DCI) and any subsequent SPS occasions that are skipped (e.g., indicated by a quantity of SPS occasions that will be skipped, represented by X in FIG. 4). Accordingly, in some aspects, the base station 110 may transmit the indication in a slot (e.g., a PDCCH slot and/or another downlink slot) that at least partially overlaps with a first SPS occasion of the one or more SPS occasions. For example, the base station 110 may transmit the indication in symbols 7 and 8 of a slot that includes an SPS occasion in symbols 8 through 14, such that the UE 120 will refrain from monitoring the SPS occasion in symbols 8 through 14 and any subsequent SPS occasions that are skipped (e.g., indicated by a quantity of SPS occasions that will be skipped, represented by X in FIG. 4). As an alternative example, the base station 110 may transmit the indication in symbols 7 and 8 of a slot that includes an SPS occasion in symbols 0 through 7, such that the UE 120 will monitor the SPS occasion in symbols 0 through 7 and then refrain from monitoring the subsequent SPS occasion along with any further subsequent SPS occasions that are skipped (e.g., indicated by a quantity of SPS occasions that will be skipped, represented by X in FIG. 4).

Accordingly, the UE 120 conserves power and processing resources during the one or more SPS occasions that are skipped. Additionally, the UE 120 may monitor for data during the periodic set of SPS occasions after refraining from monitoring during the one or more SPS occasions that are skipped, and the base station 110 may transmit data within the periodic set of SPS occasions after refraining from transmitting within the one or more SPS occasions that are skipped. Accordingly, in example 400, the base station 110 transmits data within, and the UE 120 monitors for the data during, SPS occasions 410a, 410b, 410e, 410f, 410g, and 410k.

In some aspects, the UE 120 may refrain from transmitting, and the base station 110 may refrain from monitoring for, acknowledgment feedback associated with the one or more SPS occasions that are skipped. Accordingly, the base station 110 and the UE 120 conserve network overhead and additional power and processing resources. The UE 120 may transmit acknowledgment feedback (e.g., HARQ feedback and/or other feedback) associated with the periodic set of SPS occasions after refraining from transmitting acknowledgment feedback associated with the one or more SPS occasions that are skipped. Accordingly, the base station 110 may receive acknowledgment feedback associated with the periodic set of SPS occasions after not receiving acknowledgment feedback associated with the one or more SPS occasions that are skipped. In example 400, the UE 120 may transmit, and the base station 110 may receive, acknowledgment feedback associated with SPS occasions 410a, 410b, 410e, 410f, 410g, and 410k but not associated with SPS occasions 410c, 410d, 410h, 410i, 410j, and 410l.

In some aspects, the quantity of SPS occasions that will be skipped (represented as X in FIG. 4) may be preconfigured. For example, the base station 110 may transmit, and the UE 120 may receive, an additional indication of the quantity of SPS occasions, within the periodic set of SPS occasions, that will be skipped. In some aspects, the base station 110 may include the quantity of SPS occasions using a new parameter (e.g., as defined in 3GPP specifications and/or another standard) in the SPS-Config data structure (e.g., transmitted via RRC signaling, as described above).

As an alternative, and as shown in FIG. 4, the quantity of SPS occasions that will be skipped (represented as X in FIG. 4) may vary. For example, the indication that the one or more SPS occasions will be skipped may include a quantity of the one or more SPS occasions that will be skipped. In some aspects, the indication may include a new field that indicates the quantity of SPS occasions, within the periodic set of SPS occasions, that will be skipped (e.g., when the indication is in a new SPS skipping format for DCI, as defined in 3GPP specifications and/or another standard).

As an alternative, the UE 120 may determine a quantity of SPS occasions, within the periodic set of SPS occasions, that will be skipped, based at least in part on at least one codepoint of at least one control field. For example, the UE 120 may determine a first quantity of SPS occasions that will be skipped when the RV is set to all ones and the MCS indicator is set to all ones, and a second quantity of SPS occasions that will be skipped when the RV is set to all zeroes and the MCS indicator is set to all zeroes. In another example, the UE 120 may determine a first quantity of SPS occasions that will be skipped when the RV is set to all ones and the TDRA indicator is set to all ones, and a second quantity of SPS occasions that will be skipped when the RV is set to all zeroes and the TDRA indicator is set to all zeroes. Other examples may include combinations of different control fields (e.g., the RV, the MCS indicator, the FDRA indicator, the TDRA indicator, the VRB-to-PRB mapping indicator, and/or another parameter).

Other examples may include more than two possible values for the quantity of SPS occasions that will be skipped. For example, the UE 120 may determine a first quantity of SPS occasions that will be skipped when the RV is set to all ones and the MCS indicator is set to all ones, a second quantity of SPS occasions that will be skipped when the RV is set to all zeroes and the MCS indicator is set to all zeroes, and a third quantity of SPS occasions that will be skipped when the RV is set to all ones and the MCS indicator is set to all zeroes. In another example, the UE 120 may determine a first quantity of SPS occasions that will be skipped when the RV is set to all ones and the TDRA indicator is set to all ones, a second quantity of SPS occasions that will be skipped when the RV is set to all zeroes and the TDRA indicator is set to all zeroes, and a third quantity of SPS occasions that will be skipped when the RV is set to all ones and the TDRA indicator is set to all zeroes. Other examples may include combinations of different control fields (e.g., the RV, the MCS indicator, the FDRA indicator, the TDRA indicator, the VRB-to-PRB mapping indicator, and/or another parameter).

Although described above in connection with two or three possible values for the quantity of SPS occasions that will be skipped, other examples may include more than three possible values for the quantity of SPS occasions (e.g., four, five, and so on) using a combination of different codepoints (e.g., all ones, all zeroes, and/or other codepoints) for different control fields (e.g., the RV, the MCS indicator, the FDRA indicator, the TDRA indicator, the VRB-to-PRB mapping indicator, and/or another parameter).

In some aspects, the base station 110 may transmit, and the UE 120 may receive, information associating the at least one codepoint of the at least one control field with the quantity of SPS occasions that will be skipped. For example, the base station 110 may transmit, and the UE 120 may receive, a table and/or an indicator (e.g., an index) of a table, where the table associates one or more codepoints for one or more control fields with corresponding quantities of SPS occasions that will be skipped. In some aspects, the base station 110 may include the information using a new parameter (e.g., as defined in 3GPP specifications and/or another standard) in the SPS-Config data structure (e.g., transmitted via RRC signaling, as described above).

In some aspects, the UE 120 may be configured, by the base station 110, for a plurality of periodic sets of SPS occasions. For example, the base station 110 may transmit, and the UE 120 may receive, a plurality of SPS-Config data structures. In some aspects, the base station 110 may indicate that some of the periodic sets are configured for skipping (e.g., as described above) and that others of the periodic sets are not. Accordingly, the base station 110 may transmit, and the UE 120 may receive, an indication of a release of an additional periodic set of SPS occasions. The additional periodic set may not be configured for skipping. Accordingly, the UE 120 may refrain from monitoring during the additional periodic set of SPS occasions that is released. For example, the UE 120 may validate the indication as SPS release DCI and release the additional periodic set of SPS occasions rather than skipping one or more SPS occasions in the additional periodic set of SPS occasions.

Although described using data transmitted within SPS occasions, the description similarly applies more generally to signals from the base station 110, such as channel state information—reference signals (CSI-RSs) and/or other reference signals, that are semi-persistently scheduled (e.g., according to a periodicity and/or another repetition in time). For example, the base station 110 may configure the UE 120 to perform periodic measurements of one or more CSI-RSs and may transmit an indication (e.g., as described above) to skip one or more CSI-RS measurements without releasing the periodic measurement configuration.

By using techniques described in connection with FIG. 4, the base station 110 reduces network overhead and conserves power and processing resources at the base station 110 as compared with releasing and then reactivating the set of SPS occasions. Similarly, the UE 120 conserves power and processing resources as compared with monitoring SPS occasions in which the base station 110 does not transmit data.

Although described in connection with downlink communication, the description above equally applies to uplink communication on a ULCG. In some aspects, the base station 110 may configure a set of uplink occasions using RRC signaling and/or other signaling. For example, the base station 110 may transmit, to the UE 120, a ConfiguredGrant-Config data structure (e.g., as defined in 3GPP specifications and/or another standard), or a similar data structure, that defines the set of uplink occasions. The set of uplink occasions may provide periodic windows during which the UE 120 may transmit data to the base station 110 (e.g., on a PUSCH and/or another uplink channel) without having to receive new control information, such as new DCI (e.g., on a PDCCH and/or another downlink channel) to schedule the transmission.

Additionally, the ConfiguredGrantConfig data structure may define resources for the UE 120 to use when transmitting data during the set of uplink occasions. For example, the base station 110 may indicate an MCS, an RB size, a time domain allocation, a frequency domain allocation, and/or another parameter for the UE 120 to use for transmission during the set of uplink occasions.

Accordingly, as described above, the UE 120 may transmit data, to the base station 110, during the uplink occasions without having to receive additional control information (e.g., additional DCI over a PDCCH). The base station 110 may provide control information (e.g., DCI and/or other control information) that activates and releases the set of uplink occasions. Additionally, the base station 110 may provide an indication (e.g., in DCI, a MAC-CE, a DMRS, and/or another message or signal) that configures the UE 120 to skip one or more uplink occasions in the set of uplink occasions, without having to release and reactive the set of uplink occasions. Accordingly, the base station 110 and the UE 120 reduce network overhead and conserve power and processing resources as compared with releasing and then reactivating the set of uplink occasions.

Although described using data transmitted periodically to the base station 110, the description similarly applies more generally to signals from the UE 120, such as sounding reference signals (SRSs) and/or other reference signals, channel state information (CSI) reports on a physical uplink control channel (PUCCH), and/or CSI reports on a PUSCH, among other example, that are semi-persistently scheduled (e.g., according to a periodicity and/or another repetition in time). For example, the base station 110 may configure the UE 120 to transmit SRSs periodically and may transmit an indication (e.g., as described above) to skip one or more SRS transmission occasions without releasing the periodic SRS configuration. Similarly, the base station 110 may configure the UE 120 to transmit CSI reports periodically and may transmit an indication (e.g., as described above) to skip one or more CSI transmission occasions without releasing the periodic CSI configuration.

As indicated above, FIG. 4 is provided as an example. Other examples may differ from what is described with respect to FIG. 4.

Figure 5:
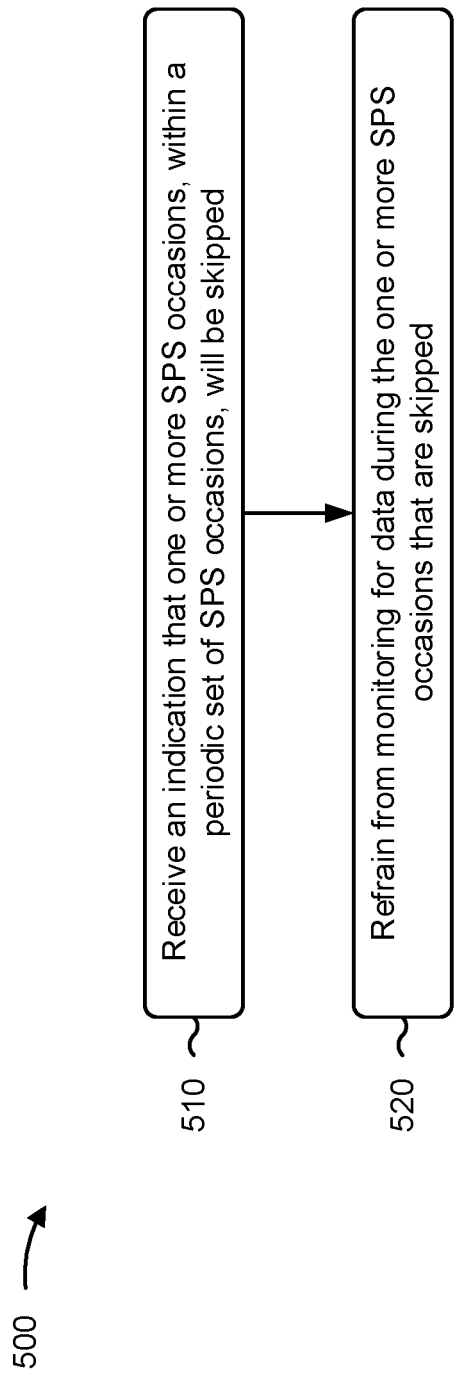
FIGS. 5 and 6 are diagrams illustrating example processes associated with skipping SPS occasions, in accordance with the present disclosure.

FIG. 5 is a diagram illustrating an example process 500 performed, for example, by a UE, in accordance with the present disclosure. Example process 500 is an example where the UE (e.g., UE 120 and/or apparatus 700 of FIG. 7) performs operations associated with skipping SPS occasions.

As shown in FIG. 5, in some aspects, process 500 may include receiving, from a base station (e.g., base station 110 and/or apparatus 800 of FIG. 8), an indication that one or more SPS occasions, within a periodic set of SPS occasions, will be skipped (block 510). For example, the UE (e.g., using reception component 702, depicted in FIG. 7) may receive, from a base station, an indication that one or more SPS occasions, within a periodic set of SPS occasions, will be skipped, as described herein.

As further shown in FIG. 5, in some aspects, process 500 may include refraining from monitoring, for signals from the base station, during the one or more SPS occasions that are skipped (block 520). For example, the UE (e.g., using monitoring component 708, depicted in FIG. 7) may refrain from monitoring, for signals from the base station, during the one or more SPS occasions that are skipped, as described herein.

Process 500 may include additional aspects, such as any single aspect or any combination of aspects described below and/or in connection with one or more other processes described elsewhere herein.

In a first aspect, process 500 further includes monitoring (e.g., using monitoring component 708), for signals from the base station, during the periodic set of SPS occasions after refraining from monitoring during the one or more SPS occasions that are skipped.

In a second aspect, alone or in combination with the first aspect, process 500 further includes refraining from transmitting (e.g., using transmission component 704, depicted in FIG. 7), to the base station, acknowledgment feedback associated with the one or more SPS occasions that are skipped.

In a third aspect, alone or in combination with one or more of the first and second aspects, process 500 further includes transmitting (e.g., using transmission component 704), to the base station, acknowledgment feedback associated with the periodic set of SPS occasions after refraining from transmitting acknowledgment feedback associated with the one or more SPS occasions that are skipped.

In a fourth aspect, alone or in combination with one or more of the first through third aspects, process 500 further includes receiving (e.g., using reception component 702), from the base station, an additional indication of a quantity of the one or more SPS occasions, within the periodic set of SPS occasions, that will be skipped.

In a fifth aspect, alone or in combination with one or more of the first through fourth aspects, the indication includes a quantity of the one or more SPS occasions, within the periodic set of SPS occasions, that will be skipped.

In a sixth aspect, alone or in combination with one or more of the first through fifth aspects, the indication is received according to an SPS release format for DCI.

In a seventh aspect, alone or in combination with one or more of the first through sixth aspects, process 500 further includes receiving (e.g., using reception component 702), from the base station, a configuration that indicates that the SPS release format includes the indication.

In an eighth aspect, alone or in combination with one or more of the first through seventh aspects, process 500 further includes validating (e.g., using determination component 710, depicted in FIG. 7) the indication based at least in part on at least one codepoint of at least one control field in the SPS release format.

In a ninth aspect, alone or in combination with one or more of the first through eighth aspects, the at least one control field includes an RV, an indication of an MCS, an indication of an FDRA, an indication of a TDRA, an indication of a VRB-to-PRB mapping, or a combination thereof.

In a tenth aspect, alone or in combination with one or more of the first through ninth aspects, the at least one codepoint of the at least one control field is set to all ones or all zeroes.

In an eleventh aspect, alone or in combination with one or more of the first through tenth aspects, process 500 further includes determining (e.g., using determination component 710) a quantity of the one or more SPS occasions, within the periodic set of SPS occasions, that will be skipped, based at least in part on the at least one codepoint of the at least one control field.

In a twelfth aspect, alone or in combination with one or more of the first through eleventh aspects, process 500 further includes receiving (e.g., using reception component 702), from the base station, information associating the at least one codepoint of the at least one control field with the quantity of the one or more SPS occasions that will be skipped.

In a thirteenth aspect, alone or in combination with one or more of the first through twelfth aspects, process 500 further includes receiving (e.g., using reception component 702), from the base station, an indication that the periodic set of SPS occasions is configured for skipping.

In a fourteenth aspect, alone or in combination with one or more of the first through thirteenth aspects, process 500 further includes receiving (e.g., using reception component 702), from the base station, an indication of a release of an additional periodic set of SPS occasions, and refraining from monitoring (e.g., using monitoring component 708) during the additional periodic set of SPS occasions that is released.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
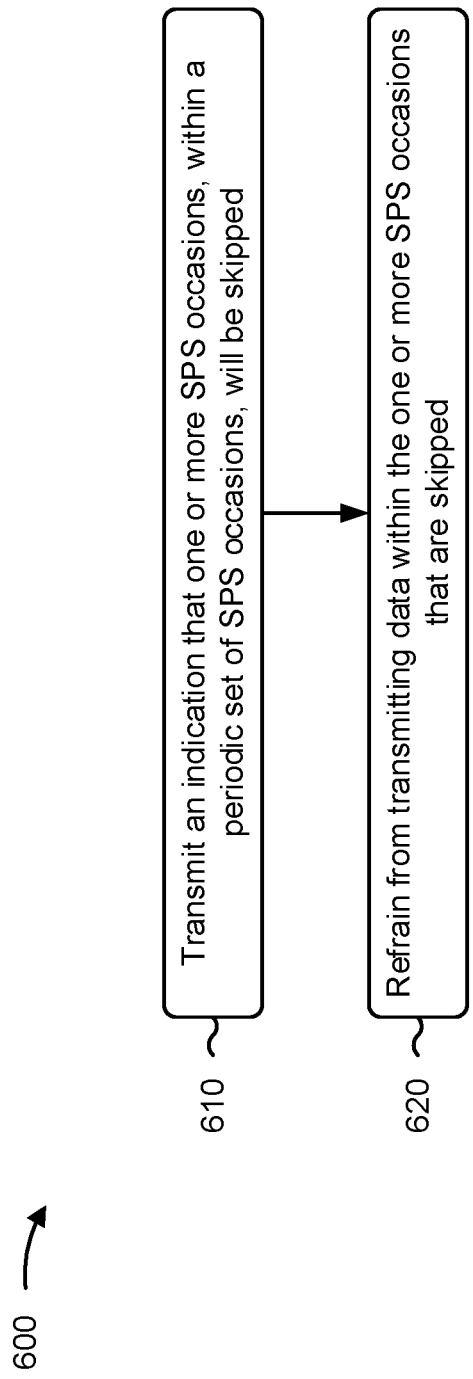

FIG. 6 is a diagram illustrating an example process 600 performed, for example, by a base station, in accordance with the present disclosure. Example process 600 is an example where the base station (e.g., base station 110 and/or apparatus 800 of FIG. 8) performs operations associated with skipping SPS occasions.

As shown in FIG. 6, in some aspects, process 600 may include transmitting, to a UE (e.g., UE 120 and/or apparatus 700 of FIG. 7), an indication that one or more SPS occasions, within a periodic set of SPS occasions, will be skipped (block 610). For example, the base station (e.g., using transmission component 804, depicted in FIG. 8) may transmit, to a UE, an indication that one or more SPS occasions, within a periodic set of SPS occasions, will be skipped, as described herein.

As further shown in FIG. 6, in some aspects, process 600 may include refraining from transmitting, to the UE, signals within the one or more SPS occasions that are skipped (block 620). For example, the base station (e.g., using transmission component 804) may refrain from transmitting, to the UE, signals within the one or more SPS occasions that are skipped, as described herein.

Process 600 may include additional aspects, such as any single aspect or any combination of aspects described below and/or in connection with one or more other processes described elsewhere herein.

In a first aspect, process 600 further includes transmitting (e.g., using transmission component 804), to the UE, signals within the periodic set of SPS occasions after refraining from transmitting within the one or more SPS occasions that are skipped.

In a second aspect, alone or in combination with the first aspect, process 600 further includes refraining from monitoring (e.g., using reception component 802, depicted in FIG. 8) for acknowledgment feedback, from the UE, associated with the one or more SPS occasions that are skipped.

In a third aspect, alone or in combination with one or more of the first and second aspects, process 600 further includes receiving (e.g., using reception component 802), from the UE, acknowledgment feedback associated with the periodic set of SPS occasions after not receiving acknowledgment feedback associated with the one or more SPS occasions that are skipped.

In a fourth aspect, alone or in combination with one or more of the first through third aspects, process 600 further includes transmitting (e.g., using transmission component 804), to the UE, an additional indication of a quantity of the one or more SPS occasions, within the periodic set of SPS occasions, that will be skipped.

In a fifth aspect, alone or in combination with one or more of the first through fourth aspects, the indication includes a quantity of the one or more SPS occasions, within the periodic set of SPS occasions, that will be skipped.

In a sixth aspect, alone or in combination with one or more of the first through fifth aspects, the indication is transmitted according to an SPS release format for DCI.

In a seventh aspect, alone or in combination with one or more of the first through sixth aspects, process 600 further includes transmitting (e.g., using transmission component 804), to the UE, a configuration that indicates that the SPS release format includes the indication.

In an eighth aspect, alone or in combination with one or more of the first through seventh aspects, the indication includes information, for validating the indication, including at least one codepoint of at least one control field in the SPS release format.

In a ninth aspect, alone or in combination with one or more of the first through eighth aspects, the at least one control field includes an RV, an indication of an MCS, an indication of an FDRA, an indication of a TDRA, an indication of a VRB-to-PRB mapping, or a combination thereof.

In a tenth aspect, alone or in combination with one or more of the first through ninth aspects, the at least one codepoint of the at least one control field is set to all ones or all zeroes.

In an eleventh aspect, alone or in combination with one or more of the first through tenth aspects, the at least one codepoint of the at least one control field indicates a number of SPS occasions, within the periodic set of SPS occasions, to be skipped by the base station.

In a twelfth aspect, alone or in combination with one or more of the first through eleventh aspects, process 600 further includes transmitting (e.g., using transmission component 804), to the UE, information associating the at least one codepoint of the at least one control field with the number of SPS occasions to be skipped by the base station.

In a thirteenth aspect, alone or in combination with one or more of the first through twelfth aspects, process 600 further includes transmitting (e.g., using transmission component 804), to the UE, an indication that the periodic set of SPS occasions is configured for skipping.

In a fourteenth aspect, alone or in combination with one or more of the first through thirteenth aspects, process 600 further includes transmitting (e.g., using transmission component 804), to the UE, an indication of a release of an additional periodic set of SPS occasions, and refraining from transmitting (e.g., using transmission component 804) signals within the additional periodic set of SPS occasions that is released.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
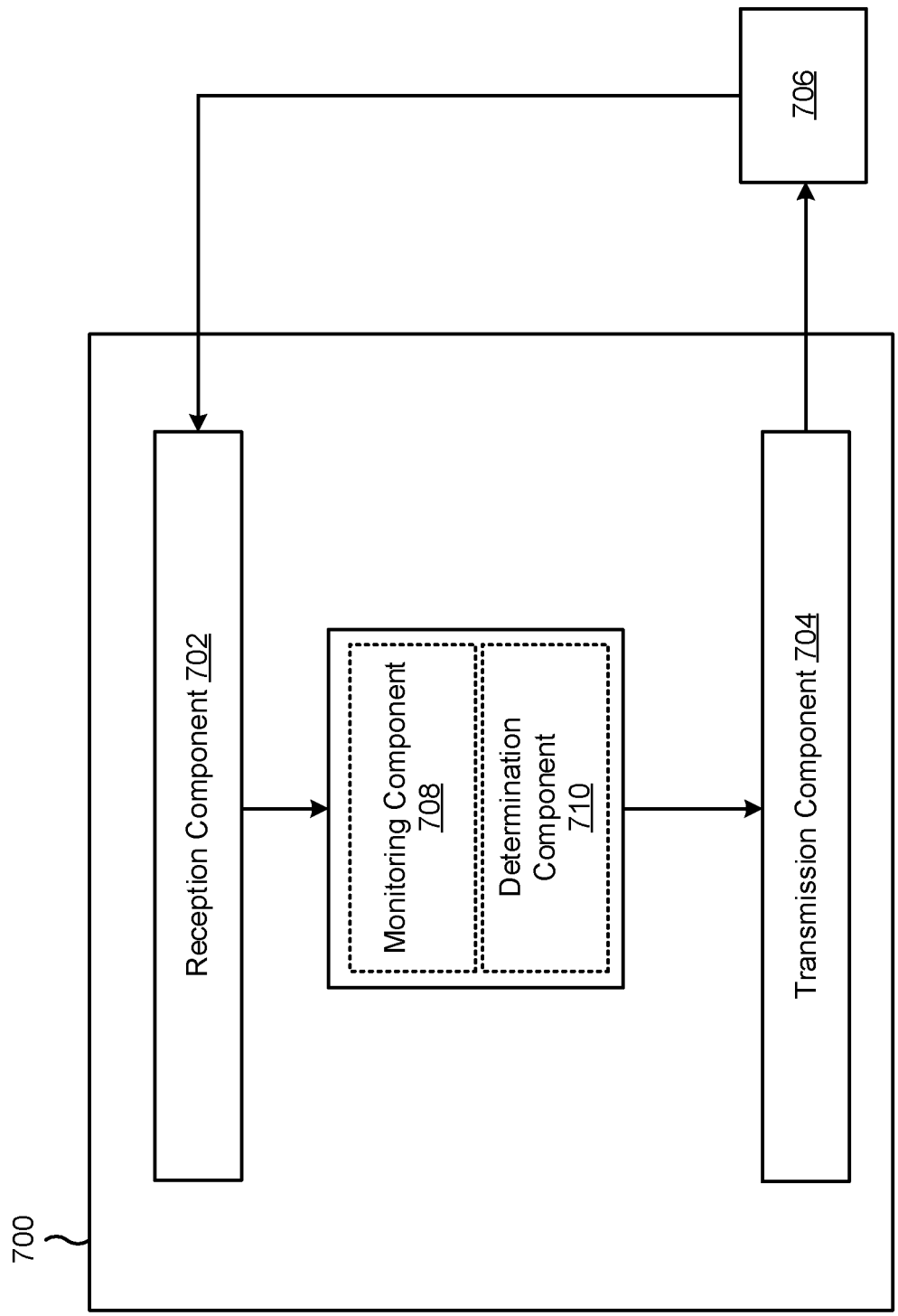
FIGS. 7 and 8 are diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a monitoring component 708 and/or a determination component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

In some aspects, the reception component 702 may receive, from the apparatus 706, an indication that one or more SPS occasions, within a periodic set of SPS occasions, will be skipped. Accordingly, the monitoring component 708 may refrain from monitoring, for signals from the apparatus 706, during the one or more SPS occasions that are skipped. The monitoring component 708 may include one or more antennas, a demodulator, a MIMO detector, a receive processor, a controller/processor, a memory, or a combination thereof, of the UE described above in connection with FIG. 2.

In some aspects, the monitoring component 708 may monitor, for signals from the apparatus 706, during the periodic set of SPS occasions after refraining from monitoring during the one or more SPS occasions that are skipped.

In some aspects, the transmission component 704 may refrain from transmitting, to the apparatus 706, acknowledgment feedback associated with the one or more SPS occasions that are skipped. Additionally, the transmission component 704 may transmit, to the apparatus 706, acknowledgment feedback associated with the periodic set of SPS occasions after refraining from transmitting acknowledgment feedback associated with the one or more SPS occasions that are skipped.

In some aspects, the reception component 702 may receive, from the apparatus 706, an additional indication of a quantity of the one or more SPS occasions, within the periodic set of SPS occasions, that will be skipped.

In some aspects, the determination component 710 may validate the indication based at least in part on at least one codepoint of at least one control field in the SPS release format. The determination component 710 may include a receive processor, a controller/processor, a memory, or a combination thereof, of the UE described above in connection with FIG. 2.

In some aspects, the determination component 710 may determine a quantity of the one or more SPS occasions, within the periodic set of SPS occasions, that will be skipped, based at least in part on the at least one codepoint of the at least one control field. In some aspects, the reception component 702 may receive, from the apparatus 706, information associating the at least one codepoint of the at least one control field with the quantity of the one or more SPS occasions that will be skipped.

In some aspects, the reception component 702 may receive, from the apparatus 706, an indication that the periodic set of SPS occasions is configured for skipping.

In some aspects, the reception component 702 may receive, from the apparatus 706, an indication of a release of an additional periodic set of SPS occasions. Accordingly, the monitoring component 708 may refrain from monitoring during the additional periodic set of SPS occasions that is released.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
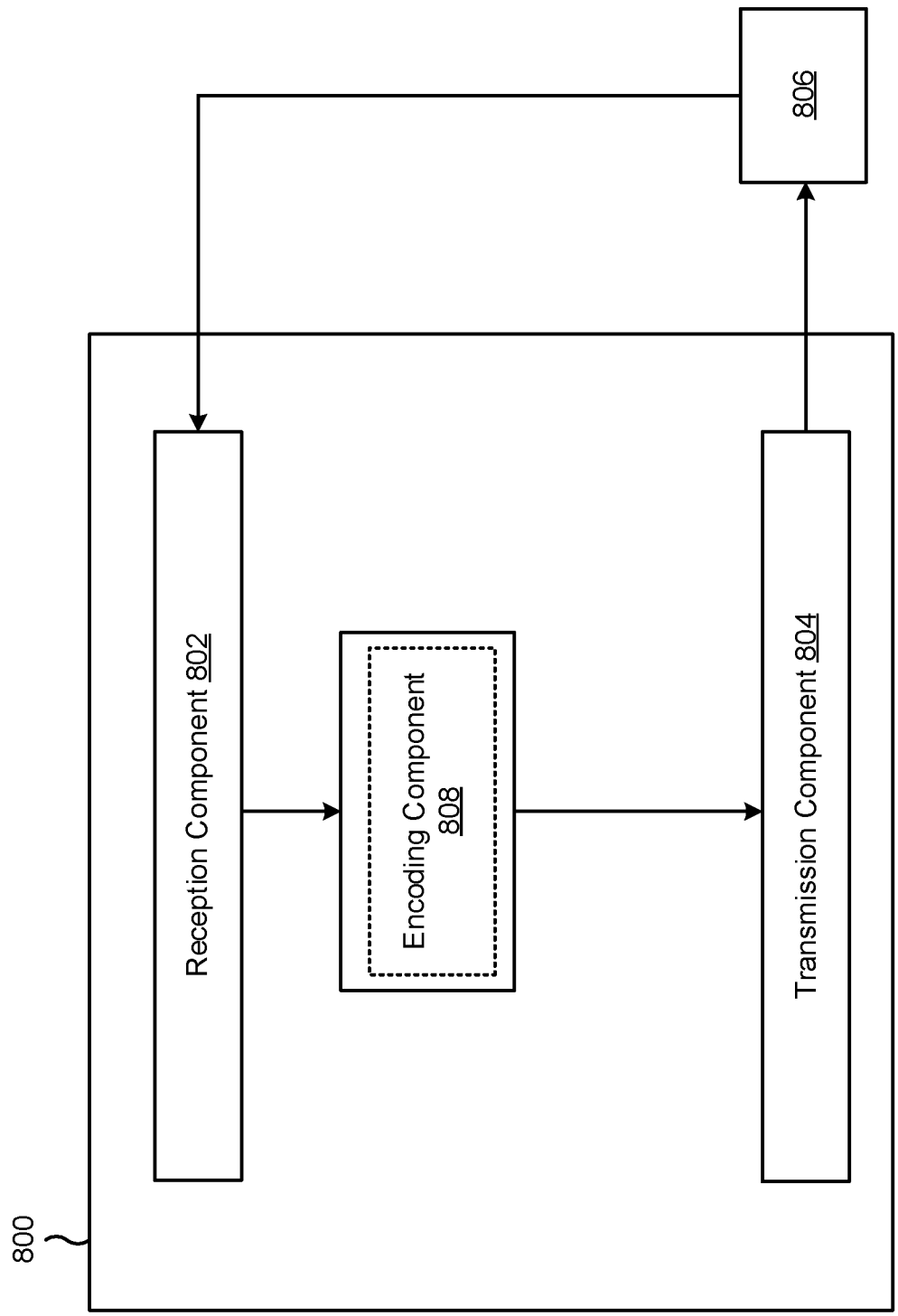

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include an encoding component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be collocated with the reception component 802 in a transceiver.

In some aspects, the transmission component 804 may transmit, to the apparatus 806, an indication that one or more SPS occasions, within a periodic set of SPS occasions, will be skipped. Accordingly, the transmission component 804 may refrain from transmitting, to the apparatus 806, signals within the one or more SPS occasions that are skipped.

In some aspects, the transmission component 804 may transmit, to the apparatus 806, signals within the periodic set of SPS occasions after refraining from transmitting within the one or more SPS occasions that are skipped.

In some aspects, the reception component 802 may refrain from monitoring for acknowledgment feedback, from the apparatus 806, associated with the one or more SPS occasions that are skipped. Additionally, the reception component 802 may receive, from the apparatus 806, acknowledgment feedback associated with the periodic set of SPS occasions after not receiving acknowledgment feedback associated with the one or more SPS occasions that are skipped.

In some aspects, the transmission component 804 may transmit, to the apparatus 806, an additional indication of a quantity of the one or more SPS occasions, within the periodic set of SPS occasions, that will be skipped.

In some aspects, the encoding component 808 may encode at least one codepoint of at least one control field such that the apparatus 806 may validate the indication. The encoding component 808 may include a transmit processor, a controller/processor, a memory, or a combination thereof, of the base station described above in connection with FIG. 2.

In some aspects, the encoding component 808 may encode the at least one codepoint of the at least one control field to indicate a quantity of the one or more SPS occasions, within the periodic set of SPS occasions, that will be skipped. In some aspects, the transmission component 804 may transmit, to the apparatus 806, information associating the at least one codepoint of the at least one control field with the quantity of the one or more SPS occasions that will be skipped.

In some aspects, the transmission component 804 may transmit, to the apparatus 806, an indication that the periodic set of SPS occasions is configured for skipping.

In some aspects, the transmission component 804 may transmit, to the apparatus 806, an indication of a release of an additional periodic set of SPS occasions. Accordingly, the transmission component 804 may refrain from transmitting signals within the additional periodic set of SPS occasions that is released.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a base station, an indication that one or more semi-persistent scheduling (SPS) occasions, within a periodic set of SPS occasions, will be skipped; and refraining from monitoring, for signals from the base station, during the one or more SPS occasions that are skipped.

Aspect 2: The method of Aspect 1, further comprising: monitoring, for signals from the base station, during the periodic set of SPS occasions after refraining from monitoring during the one or more SPS occasions that are skipped.

Aspect 3: The method of any of Aspects 1 through 2, further comprising: refraining from transmitting, to the base station, acknowledgment feedback associated with the one or more SPS occasions that are skipped.

Aspect 4: The method of Aspect 3, further comprising: transmitting, to the base station, acknowledgment feedback associated with the periodic set of SPS occasions after refraining from transmitting acknowledgment feedback associated with the one or more SPS occasions that are skipped.

Aspect 5: The method of any of Aspects 1 through 4, further comprising: receiving, from the base station, an additional indication of a quantity of the one or more SPS occasions, within the periodic set of SPS occasions, that will be skipped.

Aspect 6: The method of any of Aspects 1 through 4, wherein the indication includes a quantity of the one or more SPS occasions, within the periodic set of SPS occasions, that will be skipped.

Aspect 7: The method of any of Aspects 1 through 6, wherein the indication is received according to an SPS release format for downlink control information (DCI).

Aspect 8: The method of Aspect 7, further comprising: receiving, from the base station, a configuration that indicates that the SPS release format includes the indication.

Aspect 9: The method of any of Aspects 7 through 8, further comprising: validating the indication based at least in part on at least one codepoint of at least one control field in the SPS release format.

Aspect 10: The method of Aspect 9, wherein the at least one control field includes a redundancy value (RV), an indication of a modulation and coding scheme (MCS), an indication of a frequency domain resource allocation (FDRA), an indication of a time-domain resource allocation (TDRA), an indication of a virtual to physical mapping, or a combination thereof.

Aspect 11: The method of any of Aspects 9 through 10, wherein the at least one codepoint of the at least one control field is set to all ones or all zeroes.

Aspect 12: The method of any of Aspects 9 through 10, further comprising: determining a quantity of the one or more SPS occasions, within the periodic set of SPS occasions, that will be skipped, based at least in part on the at least one codepoint of the at least one control field.

Aspect 13: The method of Aspect 12, further comprising: receiving, from the base station, information associating the at least one codepoint of the at least one control field with the quantity of the one or more SPS occasions that will be skipped.

Aspect 14: The method of any of Aspects 1 through 13, further comprising: receiving, from the base station, an indication that the periodic set of SPS occasions is configured for skipping.

Aspect 15: The method of any of Aspects 1 through 14, further comprising: receiving, from the base station, an indication of a release of an additional periodic set of SPS occasions; and refraining from monitoring during the additional periodic set of SPS occasions that is released.

Aspect 16: A method of wireless communication performed by a base station, comprising: transmitting, to a user equipment (UE), an indication that one or more semi-persistent scheduling (SPS) occasions, within a periodic set of SPS occasions, will be skipped; and refraining from transmitting, to the UE, signals within the one or more SPS occasions that are skipped.

Aspect 17: The method of Aspect 16, further comprising: transmitting, to the UE, signals within the periodic set of SPS occasions after refraining from transmitting within the one or more SPS occasions that are skipped.

Aspect 18: The method of any of Aspects 16 through 17, further comprising: refraining from monitoring for acknowledgment feedback, from the UE, associated with the one or more SPS occasions that are skipped.

Aspect 19: The method of Aspect 18, further comprising: receiving, from the UE, acknowledgment feedback associated with the periodic set of SPS occasions after not receiving acknowledgment feedback associated with the one or more SPS occasions that are skipped.

Aspect 20: The method of any of Aspects 16 through 19, further comprising: transmitting, to the UE, an additional indication of a quantity of the one or more SPS occasions, within the periodic set of SPS occasions, that will be skipped.

Aspect 21: The method of any of Aspects 16 through 19, wherein the indication includes a quantity of the one or more SPS occasions, within the periodic set of SPS occasions, that will be skipped.

Aspect 22: The method of any of Aspects 16 through 21, wherein the indication is transmitted according to an SPS release format for downlink control information (DCI).

Aspect 23: The method of Aspect 22, further comprising: transmitting, to the UE, a configuration that indicates that the SPS release format includes the indication.

Aspect 24: The method of any of Aspects 22 through 23, wherein the indication includes information, for validating the indication, including at least one codepoint of at least one control field in the SPS release format.

Aspect 25: The method of Aspect 24, wherein the at least one control field includes a redundancy value (RV), an indication of a modulation and coding scheme (MCS), an indication of a frequency domain resource allocation (FDRA), an indication of a time-domain resource allocation (TDRA), an indication of a virtual to physical mapping, or a combination thereof.

Aspect 26: The method of any of Aspects 24 through 25, wherein the at least one codepoint of the at least one control field is set to all ones or all zeroes.

Aspect 27: The method of any of Aspects 24 through 25, wherein the at least one codepoint of the at least one control field indicates a quantity of the one or more SPS occasions, within the periodic set of SPS occasions, that will be skipped.

Aspect 28: The method of Aspect 27, further comprising: transmitting, to the UE, information associating the at least one codepoint of the at least one control field with the quantity of the one or more SPS occasions that will be skipped.

Aspect 29: The method of any of Aspects 16 through 28, further comprising: transmitting, to the UE, an indication that the periodic set of SPS occasions is configured for skipping.

Aspect 30: The method of any of Aspects 16 through 29, further comprising: transmitting, to the UE, an indication of a release of an additional periodic set of SPS occasions; and refraining from transmitting signals within the additional periodic set of SPS occasions that is released.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled to the one or more memories, which are configured, individually or in any combination, to:
        receive, from a base station, downlink control information (DCI) comprising an indication that one or more semi-persistent scheduling (SPS) occasions, within a periodic set of SPS occasions, will be skipped, wherein a quantity of the one or more SPS occasion that will be skipped is based at least in part on a redundancy value (RV) field of the DCI, a modulation and coding scheme (MCS) field of the DCI, a frequency domain resource allocation (FDRA) field of the DCI, a time-domain resource allocation (TDRA) field of the DCI, a virtual to physical mapping field of the DCI, or a combination thereof; and
        refrain from monitoring for signals from the base station during the one or more SPS occasions that are skipped.

2. The apparatus of claim 1, wherein the one or more processors are further configured to:
    monitor for signals from the base station during the periodic set of SPS occasions after refraining from monitoring during the one or more SPS occasions that are skipped.

3. The apparatus of claim 1, wherein the one or more processors are further configured to:
    refrain from transmitting, to the base station, acknowledgment feedback associated with the one or more SPS occasions that are skipped.

4. The apparatus of claim 3, wherein the one or more processors are further configured to:
    transmit, to the base station, acknowledgment feedback associated with the periodic set of SPS occasions after refraining from transmitting acknowledgment feedback associated with the one or more SPS occasions that are skipped.

5. The apparatus of claim 1, wherein the one or more processors are further configured to:
    receive, from the base station, an additional indication of a quantity of the one or more SPS occasions, within the periodic set of SPS occasions, that will be skipped.

6. The apparatus of claim 1, wherein the indication is received according to an SPS release format for the DCI.

7. The apparatus of claim 6, wherein the one or more processors are further configured to:
    receive, from the base station, a configuration that indicates that the SPS release format includes the indication.

8. The apparatus of claim 6, wherein the one or more processors are further configured to:
    validate the indication based at least in part on at least one codepoint of at least one control field in the SPS release format.

9. The apparatus of claim 8, wherein the at least one control field includes the redundancy value (RV), the MCS, the FDRA, the TDRA, the virtual to physical mapping, or a combination thereof.

10. The apparatus of claim 8, wherein the at least one codepoint of the at least one control field is set to all ones or all zeroes.

11. The apparatus of claim 8, wherein the one or more processors are further configured to:
    determine a quantity of the one or more SPS occasions, within the periodic set of SPS occasions, that will be skipped, based at least in part on the at least one codepoint of the at least one control field.

12. The apparatus of claim 11, wherein the one or more processors are further configured to:
    receive, from the base station, information associating the at least one codepoint of the at least one control field with the quantity of the one or more SPS occasions that will be skipped.

13. The apparatus of claim 1, wherein the one or more processors are further configured to:
    receive, from the base station, an indication that the periodic set of SPS occasions is configured for skipping.

14. The apparatus of claim 1, wherein the one or more processors are further configured to:
    receive, from the base station, an indication of a release of an additional periodic set of SPS occasions; and
    refrain from monitoring during the additional periodic set of SPS occasions that is released.

15. An apparatus for wireless communication at a base station, comprising:
    one or more memories; and
    one or more processors, coupled to the one or more memories, which are configured, individually or in any combination, to:
        transmit, to a user equipment (UE), downlink control information (DCI) comprising an indication that one or more semi-persistent scheduling (SPS) occasions, within a periodic set of SPS occasions, will be skipped, wherein a quantity of the one or more SPS occasion that will be skipped is based at least in part on a redundancy value (RV) field of the DCI, a modulation and coding scheme (MCS) field of the DCI, a frequency domain resource allocation (FDRA) field of the DCI, a time-domain resource allocation (TDRA) field of the DCI, a virtual to physical mapping field of the DCI, or a combination thereof; and
refrain from transmitting, to the UE, signals within the one or more SPS occasions that are skipped.

16. The apparatus of claim 15, wherein the one or more processors are further configured to:
transmit, to the UE, signals within the periodic set of SPS occasions after refraining from transmitting within the one or more SPS occasions that are skipped.

17. The apparatus of claim 15, wherein the one or more processors are further configured to:
refrain from monitoring for acknowledgment feedback, from the UE, associated with the one or more SPS occasions that are skipped.

18. The apparatus of claim 17, wherein the one or more processors are further configured to:
receive, from the UE, acknowledgment feedback associated with the periodic set of SPS occasions after not receiving acknowledgment feedback associated with the one or more SPS occasions that are skipped.

19. The apparatus of claim 15, wherein the one or more processors are further configured to:
transmit, to the UE, an indication that the periodic set of SPS occasions is configured for skipping.

20. The apparatus of claim 15, wherein the one or more processors are further configured to:
transmit, to the UE, an indication of a release of an additional periodic set of SPS occasions; and
refrain from transmitting signals within the additional periodic set of SPS occasions that is released.

21. A method of wireless communication performed by a user equipment (UE), comprising:
receiving, from a base station, downlink control information (DCI) comprising an indication that one or more semi-persistent scheduling (SPS) occasions, within a periodic set of SPS occasions, will be skipped, wherein a quantity of the one or more SPS occasion that will be skipped is based at least in part on a redundancy value (RV) field of the DCI, a modulation and coding scheme (MCS) field of the DCI, a frequency domain resource allocation (FDRA) field of the DCI, a time-domain resource allocation (TDRA) field of the DCI, a virtual to physical mapping field of the DCI, or a combination thereof; and
refraining from monitoring, for signals from the base station, during the one or more SPS occasions that are skipped.

22. The method of claim 21, further comprising:
monitoring, for signals from the base station, during the periodic set of SPS occasions after refraining from monitoring during the one or more SPS occasions that are skipped.

23. The method of claim 21, further comprising:
refraining from transmitting, to the base station, acknowledgment feedback associated with the one or more SPS occasions that are skipped.

24. The method of claim 23, further comprising:
transmitting, to the base station, acknowledgment feedback associated with the periodic set of SPS occasions after refraining from transmitting acknowledgment feedback associated with the one or more SPS occasions that are skipped.

25. The method of claim 21, further comprising:
receiving, from the base station, an additional indication of a quantity of the one or more SPS occasions, within the periodic set of SPS occasions, that will be skipped.

26. The method of claim 21, further comprising:
receiving, from the base station, an indication that the periodic set of SPS occasions is configured for skipping.

27. The method of claim 21, further comprising:
receiving, from the base station, an indication of a release of an additional periodic set of SPS occasions; and
refraining from monitoring during the additional periodic set of SPS occasions that is released.

28. A method of wireless communication performed by a base station, comprising:
transmitting, to a user equipment (UE), from a base station, downlink control information (DCI) comprising an indication that one or more semi-persistent scheduling (SPS) occasions, within a periodic set of SPS occasions, will be skipped, wherein a quantity of the one or more SPS occasion that will be skipped is based at least in part on a redundancy value (RV) field of the DCI, a modulation and coding scheme (MCS) field of the DCI, a frequency domain resource allocation (FDRA) field of the DCI, a time-domain resource allocation (TDRA) field of the DCI, a virtual to physical mapping field of the DCI, or a combination thereof; and
refraining from transmitting, to the UE, signals within the one or more SPS occasions that are skipped.

29. The apparatus of claim 12, wherein the one or more processors are further configured to:
receive the information in a radio resource control (RRC) message.

30. The apparatus of claim 1, wherein the quantity is based at least in part on one or more of the RV field of the DCI, the MCS field of the DCI, the FDRA field of the DCI, the TDRA field of the DCI, or the virtual to physical mapping field of the DCI being set to all ones or all zeroes.

* * * * *